US 12,099,891 B2

(12) United States Patent
Hu et al.

(10) Patent No.: US 12,099,891 B2
(45) Date of Patent: Sep. 24, 2024

(54) SMART CARD MANAGEMENT DEVICE AND SMART CARD MANAGEMENT METHOD

(71) Applicant: SHENZHEN UCLOUDLINK NEW TECHNOLOGY CO., LTD., Guangdong (CN)

(72) Inventors: Zhuofeng Hu, Guangdong (CN); Zhihui Gong, Guangdong (CN)

(73) Assignee: SHENZHEN UCLOUDLINK NEW TECHNOLOGY CO., LTD., Shenzhen (CN)

( * ) Notice: Subject to any disclaimer, the term of this patent is extended or adjusted under 35 U.S.C. 154(b) by 285 days.

(21) Appl. No.: 17/639,233

(22) PCT Filed: Aug. 17, 2020

(86) PCT No.: PCT/CN2020/109489
§ 371 (c)(1),
(2) Date: Feb. 28, 2022

(87) PCT Pub. No.: WO2021/042972
PCT Pub. Date: Mar. 11, 2021

(65) Prior Publication Data
US 2022/0327339 A1 Oct. 13, 2022

(30) Foreign Application Priority Data

Sep. 2, 2019 (CN) .......................... 201910824705.8

(51) Int. Cl.
G06K 7/00 (2006.01)
(52) U.S. Cl.
CPC .......... G06K 7/0039 (2013.01); G06K 7/0034 (2013.01)
(58) Field of Classification Search
CPC ........................... G06K 7/0039; G06K 7/0034
See application file for complete search history.

(56) References Cited

U.S. PATENT DOCUMENTS

| 2010/0191911 | A1* | 7/2010 | Heddes | G06F 15/16 |
| | | | | 711/E12.091 |
| 2011/0197007 | A1* | 8/2011 | Lu | G06F 13/102 |
| | | | | 710/301 |

(Continued)

FOREIGN PATENT DOCUMENTS

| CN | 101114332 A | 1/2008 |
| CN | 101699416 A | 4/2010 |

(Continued)

OTHER PUBLICATIONS

International Search Report for International PApplication No. PCT/CN2020/109489; Date fo Completion: Nov. 3, 2020; Date of Mailing: Nov. 26, 2020.

(Continued)

Primary Examiner — Henry Tsai
Assistant Examiner — John B Roche
(74) Attorney, Agent, or Firm — CANTOR COLBURN LLP

(57) ABSTRACT

A smart card management device and a smart card management method are provided, the smart card management device includes: a main controller, a serial peripheral interface control module, and a plurality of card slot control modules; the master controller is configured to obtain a smart card access request and send the smart card access request to the serial peripheral interface control module; the serial peripheral interface control module is configured to send the smart card access request to a corresponding card slot control module according to the card slot identifier; the card slot control module is configured to access a corresponding smart card according to the smart card identifier, obtain an execution result of the smart card, and store the execution result to facilitate the master controller to read the (Continued)

execution result by polling. This device can process a plurality of smart cards in parallel.

10 Claims, 3 Drawing Sheets

(56) References Cited

U.S. PATENT DOCUMENTS

| | | | |
|---|---|---|---|
| 2014/0304436 A1* | 10/2014 | Mortensen | G06F 13/10 710/18 |
| 2016/0012891 A1* | 1/2016 | Intrater | G06F 13/1668 365/189.011 |
| 2018/0121224 A1 | 5/2018 | Vajravel et al. | |

FOREIGN PATENT DOCUMENTS

| | | |
|---|---|---|
| CN | 102289696 A | 12/2011 |
| CN | 205902092 U | 1/2017 |
| CN | 110069952 A | 7/2019 |
| CN | 110569933 A | 12/2019 |
| CN | 210428500 U | 4/2020 |
| CN | 111948971 A | 11/2020 |
| KR | 20070022557 A | 2/2007 |
| WO | 2021042972 A1 | 3/2021 |

OTHER PUBLICATIONS

Translation of International Search Report for International PApplication No. PCT/CN2020/109489; Date fo Completion: Nov. 3, 2020; Date of Mailing: Nov. 26, 2020.
Written Opinion for International PApplication No. PCT/CN2020/109489; Date fo Completion: Nov. 3, 2020; Date of Mailing: Nov. 26, 2020.
Chinese Office Action corresponding to CN Application No. 201910824705.8; Mailing Date, Mar. 18, 2024.

* cited by examiner

SMART CARD MANAGEMENT DEVICE AND SMART CARD MANAGEMENT METHOD

CROSS REFERENCE TO RELATED APPLICATIONS

This application is a National Stage of PCT Application No. PCT/CN2020/109489 filed on Aug. 17, 2020, which claims priority to Chinese Patent Application No. 201910824705.8 filed on Sep. 2, 2019, and entitled "smart card management device and smart card management method", the contents each of which are incorporated herein by reference thereto.

TECHNICAL FIELD

The present disclosure relates to the technical field of communications, and particularly relates to a smart card management device and a smart card management method.

BACKGROUND

A smart card management device is generally used for managing smart cards in a unified and centralized manner to facilitate a terminal device to invoke the smart cards. At present, the smart card management device is composed of two parts, that is, main controller and card slots, there are a few of card slots, and the size of each card slot is not large, so that there are a few smart cards that can be supported by the card slots, and a processing efficiency of smart cards is relatively lower.

SUMMARY

A smart card management device and a smart card management method are provided in the embodiments of the present disclosure, and the smart card management device and the smart card management method can solve a technical problem that the conventional smart card management device supports fewer smart cards and thus has a low processing efficiency of smart card access requests.

In aspect one, a smart card management device is provided in one embodiment of the present disclosure, the smart card management device includes a main controller, a serial peripheral interface control module being in communication connection with the main controller, and a plurality of card slot control modules being in communication connection with the serial peripheral interface control module, and each of the card slot control modules is in communication connection with a plurality of smart cards;

where the master controller is configured to obtain a smart card access request and send the smart card access request to the serial peripheral interface control module, the smart card access request includes a smart card identifier and a card slot identifier;

the serial peripheral interface control module is configured to send the smart card access request to a card slot control module corresponding to the card slot identifier according to the card slot identifier;

the card slot control module is configured to access a corresponding smart card according to the smart card identifier, obtain an execution result of the smart card, and store the execution result in the card slot control module in order that the main controller reads the execution result stored in the card slot control module by polling.

In one embodiment, the serial peripheral interface control module includes a plurality of first switches and a data selector being in communication connection with the plurality of first switches, each of the card slot control modules is in communication connection with the plurality of first switches, and the data selector is configured to control, according to the card slot identifier, the first switches to access the corresponding card slot control module using a chip select signal.

In one embodiment, the serial peripheral interface control module further includes a plurality of signal drivers connected between the first switches and the main controller.

In one embodiment, the card slot control module includes a plurality of card slot controllers that correspond one-to-one to the first switches, and each of the card slot controllers is connected with the plurality of smart cards.

In one embodiment, the card slot control module further includes one or a plurality of second switches, and each of the card slot controllers is configured to control the one or plurality of second switches to access the corresponding smart card according to the smart card identifier.

In one embodiment, the serial peripheral interface control module is in communication connection with the master controller through a serial peripheral interface bus and a control bus, respectively.

In one embodiment, the smart card management device further includes a network processing unit being in communication connection with the master controller, where the master controller is configured to receive the smart card access request through the network processing unit.

In aspect two, a smart card management method is provided in one embodiment of the present disclosure, this smart card management method is applied in a smart card management device which includes a main controller, a serial peripheral interface control module being in communication connection with the main controller, and a plurality of card slot control modules being in communication connection with the serial peripheral interface control module, and each of the card slot control modules is in communication connection with a plurality of smart cards; where the smart card management method includes:

obtaining a smart card access request and sending the access request to the serial peripheral interface control module by the main controller, where the smart card access request includes a smart card identifier and a card slot identifier;

sending, by the main controller, the smart card access request to a card slot control module that corresponds to the card slot identifier according to the card slot identifier;

accessing, by the card slot control module, a corresponding smart card according to the card slot identifier;

obtaining an execution result of the smart card and storing the execution result of the smart card by the card slot control module; and reading the execution result of the smart card by polling by the main controller.

In one embodiment, the smart card access request is a smart card reading instruction or a smart card writing instruction.

In one embodiment, the method further includes:

clearing the stored execution result by the card slot control module when a preset condition is met.

In this embodiment of the present disclosure, compared to the prior art, the embodiments of the present disclosure have the advantageous effects listed below: the smart card management device includes the main controller, the serial peripheral interface control module being in communication connection with the main controller, and a plurality of card slot control modules being in communication connection with the serial peripheral interface control module, each of the card slot control modules is in communication connection with a plurality of smart cards, the main controller sends a smart card access request to a corresponding card slot control module through the serial peripheral control module, and reads the execution result stored in the card slot control module by polling, thereby processing the plurality of smart cards in parallel to realize a management of a huge number of smart cards, and improving a processing efficiency of smart card access requests.

BRIEF DESCRIPTION OF THE DRAWINGS

In order to describe the embodiments of the present disclosure more clearly, a brief introduction regarding the accompanying drawings that need to be used for describing the embodiments of the present disclosure or the prior art is given below; it is apparent that the accompanying drawings described below are merely some embodiments of the present disclosure, a person of ordinary skill in the art may also acquire other drawings according to the current drawings without paying creative labor.

DESCRIPTION OF THE EMBODIMENTS

Figure 1:
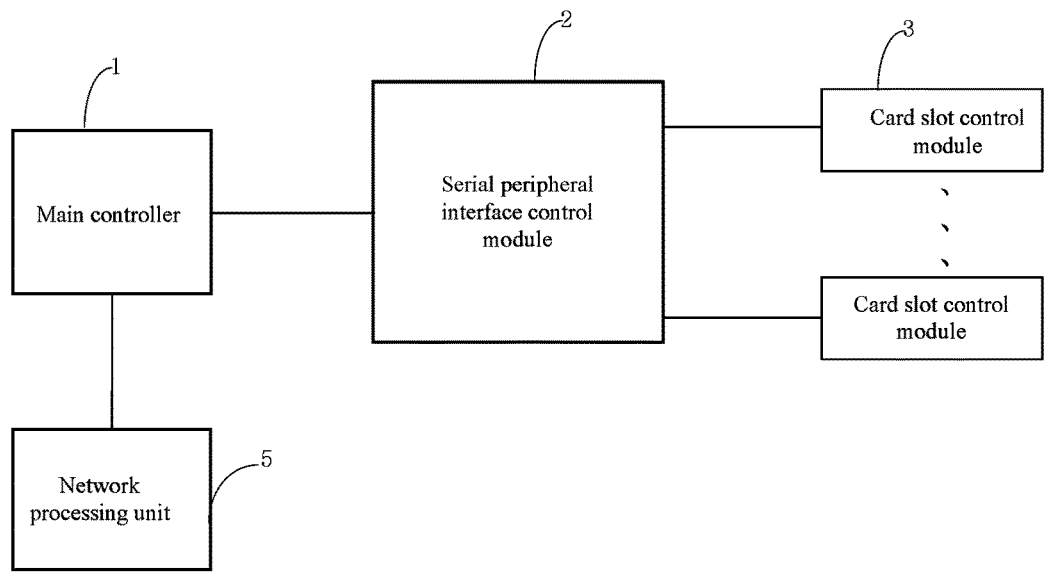
FIG.1 illustrates a structural block diagram of a smart card management device according to one embodiment of the present disclosure.

In the following descriptions, in order to describe but not intended to limit the present disclosure, concrete details such as specific system structure, technique, and the like are proposed, so that a comprehensive understanding of the embodiments of the present disclosure is facilitated. However, it will be apparent to the ordinarily skilled one in the art that, the present disclosure can also be implemented in some other embodiments without these concrete details. In some other conditions, detailed explanations of method, circuit, device and system well known to the public are omitted, so that unnecessary details may be prevented from obstructing the description of the present disclosure.

It should be understood that, when a term "comprise/include" is used in the description and annexed claims, the term "comprise/include" indicates existence of the described characteristics, integer, steps, operations, elements and/or components, but not exclude existence or adding of one or more other characteristics, integer, steps, operations, elements, components and/or combination thereof.

It should also be understood that, terms "and/or" used in the description and the annexed claims of the present disclosure are referred to as any combination of one or a plurality of listed item(s) associated with each other and all possible items, and including these combinations.

As used in the description and the annexed claims, a term "if" may be interpreted as "when" or "once" or "in response to determination" or "in response to detection". Similarly, terms such as "if it is determined that", or "if it is detected that (a described condition or event)" may be interpreted as "once it is determined" or "in response to the determination" or "once it is detected that (the described condition or event)" or "in response to the detection (the described condition or event)".

Additionally, in the descriptions of the specification and the annexed claims of present disclosure, terms such as "first" and "second", "third", etc., are only intended to be distinguished in description, but shouldn't be interpreted as indicating or implying a relative importance.

The descriptions of "referring to one embodiment" and "referring to some embodiments", and the like as described in the specification of the present disclosure means that a specific feature, structure, or characters which are described with reference to this embodiment are included in one embodiment or some embodiments of the present disclosure. Thus, the sentences of "in one embodiment", "in some embodiments", "in some other embodiments", "in other embodiments", and the like in this specification are not necessarily referring to the same embodiment, but instead indicate "one or more embodiments instead of all embodiments", unless there is a special emphasis in other manner otherwise. The terms "comprising", "including", "having" and their variations mean "including but is not limited to", unless there is a special emphasis in other manner otherwise.

Figure 2:
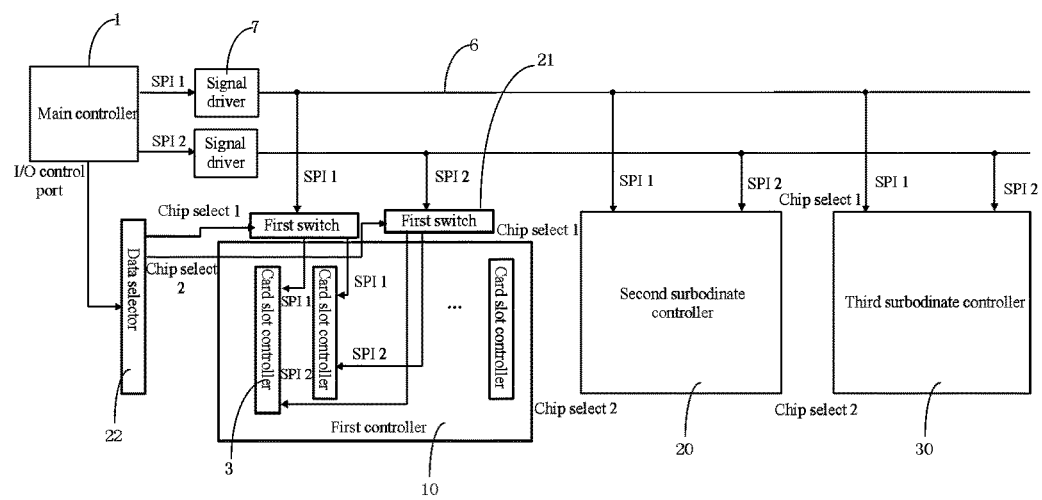
FIG. 2 illustrates a schematic block diagram of the smart card management device according to one embodiment of the present disclosure.
Figure 3:
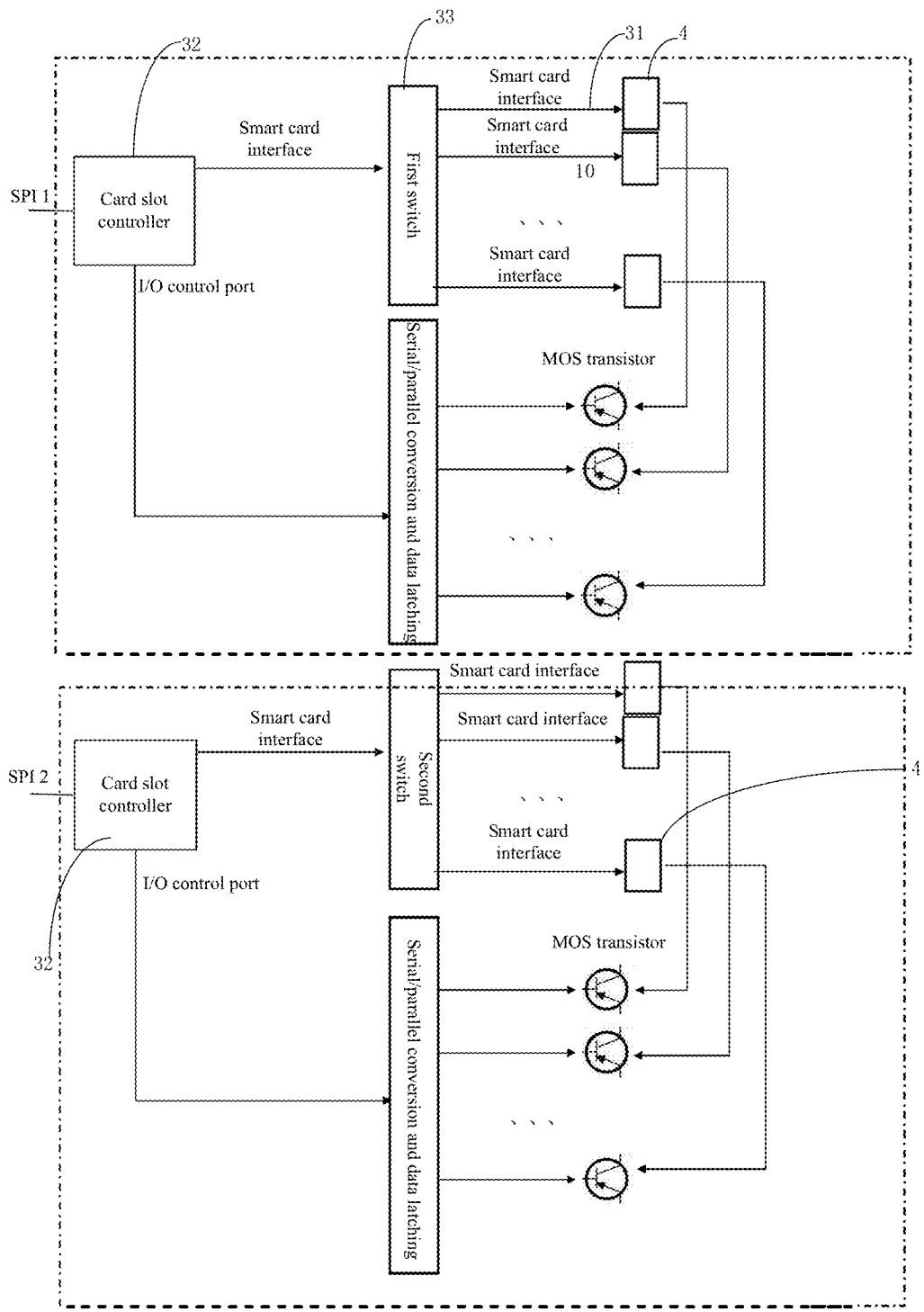
FIG. 3 illustrates a schematic block diagram of a card slot control module according to one embodiment of the present disclosure.

As shown in FIGS. 1-3, a smart card management device according to one embodiment of the present disclosure includes: a main controller 1, a serial peripheral interface control module 2 being in communication connection with the main controller 1, and a plurality of card slot control modules 3 being in communication connection with the serial peripheral interface control module 2; each card slot control module 3 is in communication connection with a plurality of smart cards 4. Where the smart card 4 is a SIM (Subscriber Identification Module) card, and the card slot control module 3 includes a plurality of smart card interfaces 31, and the smart cards 4 are communicated with the smart card interfaces 31 respectively.

The master controller 1 is configured to obtain a smart card access request and send the smart card access request to the serial peripheral interface control module 2, where the smart card access request includes a smart card identifier and a card slot identifier; the serial peripheral interface control module 2 is configured to send an access request to the card slot control module 3 that corresponds to the card slot identifier according to the card slot identifier; and the card slot control module 3 is configured to access a corresponding smart card 4 according to the smart card identifier, obtain an execution result of the smart card 4 and store the execution result, in order that the master controller 1 reads the execution result stored in the card slot control module 3 by polling.

Where each card slot control module 3 corresponds to one unique card slot identifier, each smart card 4 corresponds to one unique smart card identifier, the smart card identifier is a location identifier of the smart card or the number of the SIM card. In one preferable embodiment, an external terminal device sends a smart card access request to the master controller 1, two methods of accessing the master controller 1, i.e., accessing the master controller 1 directly by the external terminal device and accessing the master controller 1 by the external terminal device through a server, are included. The smart card management device further includes a network processing unit 5 being in communication connection with the master controller 1, the network processing unit 5 may be, for example, a Wi-Fi (Wireless Fidelity) module, or a 4G (The 4th Generation Mobile Communication Technology) module, etc., the master controller 1 is configured to receive the smart card access request sent by the terminal device through the network processing unit 5. The terminal device may be a mobile phone, a tablet computer, a wearable device, a vehicle-mounted device, an AR(Augmented Reality)/VR(Virtual Reality) device, a laptop, an UMPC(Ultra Mobile Personal Computer), a netbook, a PDA (Personal Digital Assistant), or the like.

In one embodiment, the master controller 1 communicates in a master-slave mode, after receiving a plurality of smart card access requests in parallel, the master controller 1 parses the smart card access requests to obtain an internal access request, where the internal access request includes the smart card identifier, the card slot identifier, and requested operation content, the master controller 1 sends the internal access request to the serial peripheral interface control module 2; the serial peripheral interface control module 2 selects a card slot control module 3 according to a card slot identifier corresponding to the internal access request, and sends the internal access request to the corresponding card slot control module 3; the card slot control module 3 accesses the corresponding smart card 4 according to the smart card identifier, perform an operation on the smart card 4 according to the requested operation content and stores a corresponding execution result; after all smart card access requests are sent out, the master controller 1 reads the execution results by polling, for example, the master controller 1 sends clock signals to the corresponding card slot control modules 3 sequentially according to a sequence of time when the access requests are sent so as to read the information stored in the card slot control module 3. Therefore, a parallel processing of multiple smart card access requests is realized, and an efficiency of processing of smart card access requests is improved. Where the access request may be a smart card reading instruction or a smart card writing instruction. For example, contact information in the smart card is read or contact information is added into the smart card. After the access request is obtained, the smart card 4 performs an ID authentication first, and stores an authentication result in the card slot control module 3.

In this embodiment described above, the smart card management device includes the main controller 1, the serial peripheral interface control module 2 being in communication connection with the main controller 1, and the plurality of card slot control modules 3 being in communication connection with the serial peripheral interface control module 2, each card slot control module 3 is in communication connection with the plurality of smart cards 4, the master controller 1 sends smart card access requests to the corresponding card slot control modules 3 sequentially through the serial peripheral interface control module 2, and then reads the execution results stored in the card slot control modules 3 by polling, thereby realizing the parallel processing of the plurality of smart cards 4, and improving the processing efficiency of smart card access requests.

In one preferable embodiment, the serial peripheral interface control module 2 is in communication connection with the master controller 1 through a serial peripheral interface bus 6 and a control bus respectively, and the control bus of the master controller 1 may be connected to the plurality of serial peripheral interface control modules 2 through the serial peripheral interface bus 6, so that a parallel processing of access requests in batches is implemented. By way of example but not limitation, as shown in FIG. 2, a first surbodinate controller 10, a second surbodinate controller 20, and a third surbodinate controller 30 are respectively connected to the serial peripheral interface bus 6 through one serial peripheral interface control module 2 to control the plurality of smart cards 4, one single master controller 1 controls the plurality of smart cards 4, so that the cost of device deployment is reduced, and a deployment efficiency is improved. Where the second surbodinate controller 20, the third surbodinate controller 30 and the first surbodinate controller 10 have the same structure. Furthermore, due to the fact that a signal transmission speed of the serial peripheral interface bus 6 is up to 18 Mb/s, such that the main controller 1 can send access request to all card slot control modules 3 within a time period during which the smart card 4 has completed processing of the single command, and read the execution result, so that an efficiency of communication is improved.

In one preferable embodiment, the serial peripheral interface control module 2 includes a plurality of first switches 21 and a data selector 22 that is in communication connection with the plurality of first switches 21, the data selector 22 is in communication connection with the main controller 1 through the control bus, each card slot control module 3 is in communication connection with the plurality of first switches 21, and the plurality of first switches 21 access one single card slot control module 3 in parallel, thereby improving the communication efficiency. The data selector 22 is configured to use a chip select signal to control the first switches 21 to access the corresponding card slot control module 3 according to the card slot identifier, for example, the master controller 1 sets the sequence of transmission of the smart card access requests, so that the data selector 22 controls, according to the card slot control module 3 corresponding to the current access request, the first switches 21 to communicate with the card slot control module 3 that corresponds to the current access request, and switches off the communication connections between the first switches 21 and other card slot control module 3 simultaneously.

As shown in FIG. 3, the card slot control module 3 includes a plurality of card slot controllers 32 that correspond one-to-one to the first switches 21, and each card slot controller 32 is in communication connection with the plurality of smart cards 4. For example, each of the card slot control modules 3 includes two card slot controllers 32, and there are two first switches 21 correspondingly, each card slot controller 32 is connected to one first switch 21, so that two smart cards 4 that corresponds to each card slot control module 32 can be accessed at the same time, and the efficiency of accessing smart cards 4 is further improved. In one preferable embodiment, the card slot control module 3 clears the stored execution results when a preset condition is met. For example, the card slot control module 3 performs serial/parallel conversion and data latching on the execution result of the smart card 4, and clears the corresponding execution result after the main controller 1 has completed reading the execution result.

Furthermore, the card slot control module 3 further includes a second switch 33, the card slot controller 32 is configured to control the second switch 33 to access the smart card 4 that corresponds to the smart card identifier, where the second switch 33 accesses the corresponding smart card 4 in a chip select manner, for example, the second switch 33 sends an access request to the smart card 4 that corresponds to the smart card identifier according to the time when the smart card identifier is obtained, and the communication connections between the card slot control module 3 and other smart card 4 is switched off simultaneously. By way of example but not limitation, each card slot controller 32 is connected with 8 smart cards 4, and each card slot control module 3 includes two card slot controllers 32, that is, each card slot control module 32 is in communication connection with 16 smart cards 4; there are two first switch switches 21 correspondingly, each of the first switches 21 is in communication connection with 16 card slot control modules 3, that is, the number of smart cards 4 corresponding to the first surbodinate controller 10 is 256, the main controller 1 is connected to the first surbodinate controller 10, the second surbodinate controller 20 and the third surbodinate controller 30 through the serial peripheral interface bus 6, and thus controls 768 smart cards in total, the main controller 1 can access 48 card slot control modules 3 simultaneously, and can access 96 smart cards through the 48 card slot control modules 3 simultaneously.

In one embodiment, a command format sent by the master controller 1 includes a command or a query flag, a command sequence number, a command length, a position of a SIM card, a read/write card command, and a CRC (Cyclic Redundancy Code) check. Two values may be taken by the command or the query flag, and the two values are 0xaa and 0x00 which are used to identify an execution command and a query command, respectively. A command sequence number is an unique identifier of this command, and is used to find, when a command is received, a command which has the same sequence number as the received command. The command length is used to indicate the number of bytes of the command. The position of the SIM card is the position of the SIM card in the card slot, and can be expressed as, for example, 0-7, the card slot control module 3 determines the corresponding SIM card according to the position of the SIM card. The read-write card command is command content. The CRC check is used to check all data of the command to ensure the correctness of the command.

The format of the command fed back by the card slot includes a valid flag of response data, a command sequence number, a command length, a position of a SIM card, a command response or error information, and a CRC check, where two values may be taken by the valid flag of response data, and the two values are 0Xaa and 0x00 respectively; when 0xaa represents an effective response command, 0x00 represents that there is no command response or the execution of the command has not been completed.

The main controller 1 includes a service layer and a communication layer. After the master controller 1 obtains the smart card access request, the service layer enables one or a plurality of threads according to the number of concurrent services, and decomposes the services into a series of commands of smart card 4 and send the commands to a send queue according to the smart card access request, and determines whether the responses to the commands are received or not by searching in a receive queue periodically. The communication layer uses a thread for data transmission and a thread for receiving data to send and receive commands. When the thread for data transmission detects that the send queue is not empty, the thread for data transmission sends the commands in the send queue to the card slot control module 3 through the serial peripheral interface control module 2, the card slot control module 3 removes the received commands into a command processing queue and executes the commands in sequence. After executions of the commands are completed, the card slot control module 3 sends the command response information or the command error information according to the execution results of the commands, and transfers the command response information to a SPI (Serial Peripheral Interface) data transmission area where the command response information is wait to be transmitted. The master controller 1 determines whether there is a command to be received in the receive queue by searching in the receive queue periodically, if there is a command to be received in the receive queue, a query command is sent according to the command sequence number, all response information is retrieved, so that a high efficient read/write operation is realized.

In one preferable embodiment, the serial peripheral interface control module 2 further includes a plurality of signal drivers 7 (e.g., signal amplifiers) connected between the first switches 21 and the main controller 1, so that signals can be enhanced and signal interference can be reduced, signals can be transmitted further away through the serial peripheral interface bus 6 at a high rate, in this way, a size of the smart card management device can be enlarged to support more smart cards 4.

Figure 4:
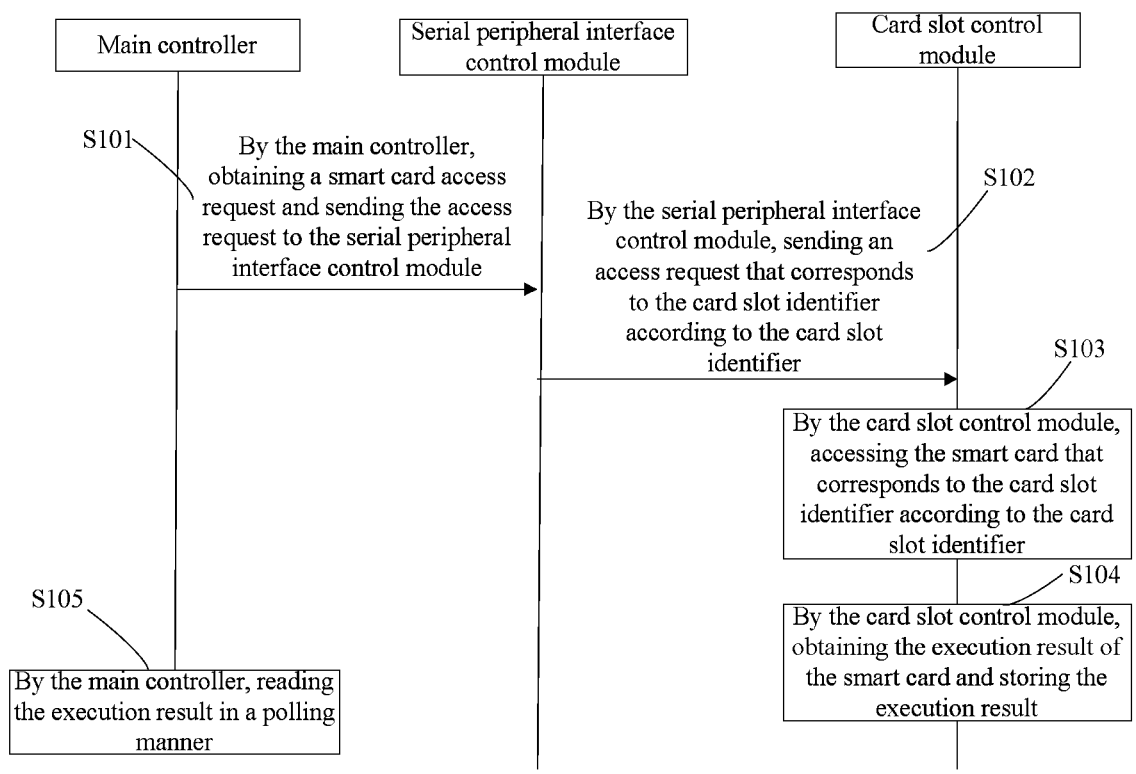
FIG. 4 illustrates a schematic flow diagram of a smart card management

As shown in FIG. 4, a smart card management method is provided in one embodiment of the present disclosure, this smart card management method is applied to the smart card management device, and includes:

At a step of S101, a smart card access request is obtained and sent to a serial peripheral interface control module 2 by a master controller 1, where the smart card access request includes a smart card identifier and a card slot identifier.

Where the smart card access request is a smart card reading command or a smart card writing command, such as a command of reading contact information in the smart card 4 or a command of adding contact information into the smart card 4.

At a step of S102, a smart card access request is sent to a card slot control module 3 that corresponds to the card slot identifier by the serial peripheral interface control module 2 according to the card slot identifier.

At a step of S103, the smart card 4 that corresponds to the card slot identifier is accessed by the card slot control module 3 according to the card slot identifier. At a step of S104, an execution result of the smart card 4 is obtained and stored by the card slot control module 3.

At a step of S105, the execution result is read by the master controller 1 by polling.

In one preferable embodiment, the card slot control module 3 clears the stored execution result when a preset condition is met. For example, the card slot control module 3 performs serial/parallel conversion and data latching on the execution result of the smart card 4, and clears the corresponding execution result after the main controller 1 has completed reading operation of the execution result of the smart card 4.

It should be understood that, the values of serial numbers of the steps in the aforesaid embodiments do not mean a sequencing of execution sequences of the steps, the execution sequences of the steps should be determined by functionalities and internal logic of the steps, and shouldn't be regarded as limitation to an implementation process of the embodiment of the present disclosure.

It needs to be noted that, the method embodiment and the device embodiment of the present disclosure are based on the same concept, regarding the detail of the implementation process and the technical effects of the method embodiment, reference can be made to the device embodiment, so that the detail of the implementation process and the technical effects of the method embodiment are not repeatedly described herein.

In the aforesaid embodiments, the descriptions of the embodiments are emphasized respectively, regarding the part of an embodiment which is not described or disclosed in detail, reference can be made to relevant descriptions in some other embodiments.

A person of ordinary skill in the art may be aware of that, the elements and algorithm steps of each of the examples described in connection with the embodiments disclosed herein may be implemented in electronic hardware, or in combination with computer software and electronic hardware. Whether these functions are implemented by hardware or software depends on the specific application and design constraints of the technical solution. The skilled people could use different methods to implement the described functions for each particular application, however, such implementations should not be considered as going beyond the scope of the present disclosure.

It should be understood that, in the embodiments of the present disclosure, the disclosed device/network device and the method can be implemented in other ways. For example, the device described above are merely illustrative; for example, the division of the units is only a logical function division, and other division could be used in the actual implementation, for example, multiple units or components could be combined or integrated into another system, or some features may be ignored, or not performed. In another aspect, the coupling or direct coupling or communicating connection shown or discussed could be an indirect coupling or a communicating connection through some interfaces, devices or units, and the coupling or direct coupling or communicating connection could be electrical, mechanical, or in other form.

The units described as separate components can be or can not be physically separate, the components shown as units can be or can not be physical units, the components may be located in one place, or be distributed onto multiple network elements. A part or a whole of the elements can be selected to achieve the objective of the technical solution of this embodiment according to the actual requirement.

The embodiments described above are only intended to explain but not to limit the technical solutions of the present disclosure. Although the present application has been explained in detail with reference to these embodiments, a person of ordinary skilled in the art that may be aware of the fact that, the technical solutions disclosed in the embodiments can also be amended, some technical features in the technical solutions can also be equivalently replaced; the amendments or the equivalent replacements don't cause the essence of the corresponding technical solutions to be deviated from the spirit and the scope of the technical solutions in the embodiments of the present disclosure, and thus should all be included in the protection scope of the present disclosure.

What is claimed is:

1. A smart card management device, comprising: a main controller, a serial peripheral interface control module being in communication connection with the main controller, and a plurality of card slot control modules being in communication connection with the serial peripheral interface control module, and each of the plurality of card slot control modules is in communication connection with a plurality of smart cards;
    wherein a master controller is configured to obtain a smart card access request and send the smart card access request to the serial peripheral interface control module, the smart card access request includes a smart card identifier and a card slot identifier;
    the serial peripheral interface control module is configured to send, according to the card slot identifier, the smart card access request to a card slot control module corresponding to the card slot identifier; and
    the card slot control module is configured to access a corresponding smart card according to the smart card identifier, obtain an execution result of the corresponding smart card, and store the execution result in the card slot control module in order that the main controller reads the execution result in the card slot control module by polling.

2. The smart card management device according to claim 1, wherein the serial peripheral interface control module comprises a plurality of first switches and a data selector being in communication connection with the plurality of first switches, each of the plurality of card slot control modules is in communication connection with the plurality of first switches, and the data selector is configured to use a chip select signal to control the first switches to access a corresponding card slot control module according to the card slot identifier.

3. The smart card management device according to claim 2, wherein the serial peripheral interface control module further comprises signal drivers connected between the first switches and the main controller.

4. The smart card management device according to claim 2, wherein the card slot control module comprises a plurality of card slot controllers that correspond one-to- one to the first switches, and each of the card slot controllers is connected with the plurality of smart cards.

5. The smart card management device according to claim 4, wherein the card slot control module further comprises one or a plurality of second switches, and each of the card slot controllers is configured to control the one or plurality of second switches to access the corresponding smart card according to the smart card identifier.

6. The smart card management device according to claim 1, wherein the serial peripheral interface control module is in communication connection with the master controller through a serial peripheral interface bus and a control bus, respectively.

7. The smart card management device according to claim 1, further comprising a network processing unit being in communication connection with the master controller, wherein the master controller is configured to receive the smart card access request through the network processing unit.

8. A smart card management method applied in a smart card management device which comprises a main controller, a serial peripheral interface control module being in communication connection with the main controller, and a plurality of card slot control modules being in communication connection with the serial peripheral interface control module, and each of the plurality of card slot control modules is in communication connection with a plurality of smart cards; wherein the smart card management method comprises:
    obtaining a smart card access request and sending the access request to the serial peripheral interface control module by the main controller, wherein the smart card access request comprises a smart card identifier and a card slot identifier;
    sending, by the main controller, the smart card access request to a card slot control module that corresponds to the card slot identifier according to the card slot identifier;
    accessing, by the card slot control module, a corresponding smart card according to the card slot identifier;
    obtaining an execution result of the corresponding smart card and storing the execution result of the corresponding smart card by the card slot control module; and
    reading the execution result of the corresponding smart card by polling by the main controller.

9. The smart card management method according to claim 8, wherein the smart card access request is a smart card reading instruction or a smart card writing instruction.

10. The smart card management method according to claim 9, further comprising:
   clearing the stored execution result by the card slot control module when a preset condition is met.

\* \* \* \* \*